US008604647B2

(12) United States Patent
Hu et al.

(10) Patent No.: US 8,604,647 B2
(45) Date of Patent: Dec. 10, 2013

(54) LINEAR ACTUATING DEVICE FOR VEHICLE USE (75) Inventors: Tsung-Hsien Hu, Lugong (TW); Chih-Jung Yeh, Lugong (TW)

(73) Assignee: Automotive Research & Testing Center, Lugong (TW)

( * ) Notice: Subject to any disclaimer, the term of this patent is extended or adjusted under 35 U.S.C. 154(b) by 195 days.

(21) Appl. No.: 13/052,619

(22) Filed: Mar. 21, 2011

(65) Prior Publication Data
US 2012/0242173 A1   Sep. 27, 2012

(51) Int. Cl.
*H02K 35/02* (2006.01)
*H02K 41/03* (2006.01)

(52) U.S. Cl.
CPC .............. *H02K 41/031* (2013.01); *H02K 35/02* (2013.01)
USPC ......... 310/12.18; 310/14; 310/15; 310/49.01; 310/156.01

(58) Field of Classification Search
CPC ....... H02K 33/16; H02K 36/02; H02K 35/06; H02K 35/02; H02K 41/031
USPC ................... 310/12.18, 14, 15, 49.01, 156.01
IPC ............................................ H02K 35/02, 41/03
See application file for complete search history.

(56) References Cited

U.S. PATENT DOCUMENTS

| 5,872,407 | A * | 2/1999 | Kitaoka et al. | 310/12.14 |
| 8,097,987 | B2 * | 1/2012 | Chao et al. | 310/12.33 |
| 2003/0205941 | A1 * | 11/2003 | Suzuki et al. | 310/49 R |
| 2006/0028072 | A1 * | 2/2006 | Iwasa et al. | 310/14 |
| 2006/0181158 | A1 * | 8/2006 | Tajima et al. | 310/12 |
| 2008/0079319 | A1 * | 4/2008 | Okada et al. | 310/12 |
| 2010/0044144 | A1 * | 2/2010 | Tajima et al. | 180/443 |
| 2011/0037327 | A1 * | 2/2011 | Denne | 310/12.16 |
| 2012/0242173 | A1 * | 9/2012 | Hu et al. | 310/12.18 |

FOREIGN PATENT DOCUMENTS

| TW | 200824257 A | 6/2008 |
| TW | 200901605 A | 1/2009 |
| TW | 200931771 A | 7/2009 |

OTHER PUBLICATIONS

International Search Report of TW Patent Application No. 099146898 mailed Nov. 26, 2012, 1 page.

* cited by examiner

*Primary Examiner* — John K Kim
(74) *Attorney, Agent, or Firm* — Lando & Anastasi, LLP (57) ABSTRACT A linear actuating device includes a track unit having an insulating sleeve made of non-metallic material and surrounding an axis, a plurality of coils mounted spacedly and sleevingly on the insulating sleeve along the axis, and a shell containing the insulating sleeve and the coils. The linear actuating device also includes a forcer unit having an elongate member extending through the insulating sleeve, having a segment configured for connecting to a vehicle shaft, and being movable along the axis relative to the insulating sleeve. The forcer unit also includes a plurality of magnets mounted spacedly relative to the axis and sleevingly on the elongate member.

6 Claims, 7 Drawing Sheets

LINEAR ACTUATING DEVICE FOR VEHICLE USE

BACKGROUND OF THE INVENTION

1. Field of the Invention

The invention relates to a linear actuating device, more particularly to a linear actuating device for vehicle use.

2. Description of the Related Art

A conventional linear actuating device for steering or braking of a vehicle may use a rotational motor to rotate a ball-and-screw mechanism that drives linear motion of a rack or a shaft. The rack in turn assists with vehicle steering or braking. The conventional linear actuating device may include a plurality of moving parts that drive the linear motion of the rack or the shaft and that may increase a cost of design and manufacture, and may increase a likelihood of part failure. In addition, the conventional linear actuator may be prone to torque ripples that translate into unsteady motion or application of force.

SUMMARY OF THE INVENTION

Therefore, an object of the present invention is to provide a linear actuating device for generating a linear force that provides improvements over the conventional linear actuating device.

A linear actuating device for vehicle use according to the present invention includes a track unit having an insulating sleeve made of non-metallic material and surrounding an axis, a plurality of coils mounted spacedly and sleevingly on the insulating sleeve along the axis, and a shell containing the insulating sleeve and the coils. The linear actuating device also includes a forcer unit having an elongate member extending through the insulating sleeve, having a segment configured for connecting to a vehicle shaft, and being movable along the axis relative to the insulating sleeve. The forcer unit also includes a plurality of magnets mounted spacedly relative to the axis and sleevingly on the elongate member.

The coils and the insulating sleeve of the linear actuating device for vehicle use of the present invention permit smooth movement of the elongate member and a correspondingly smooth linked movement of a vehicle shaft. In comparison with the conventional linear actuating device, the present invention has fewer moving parts and may reduce a likelihood of part failure.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
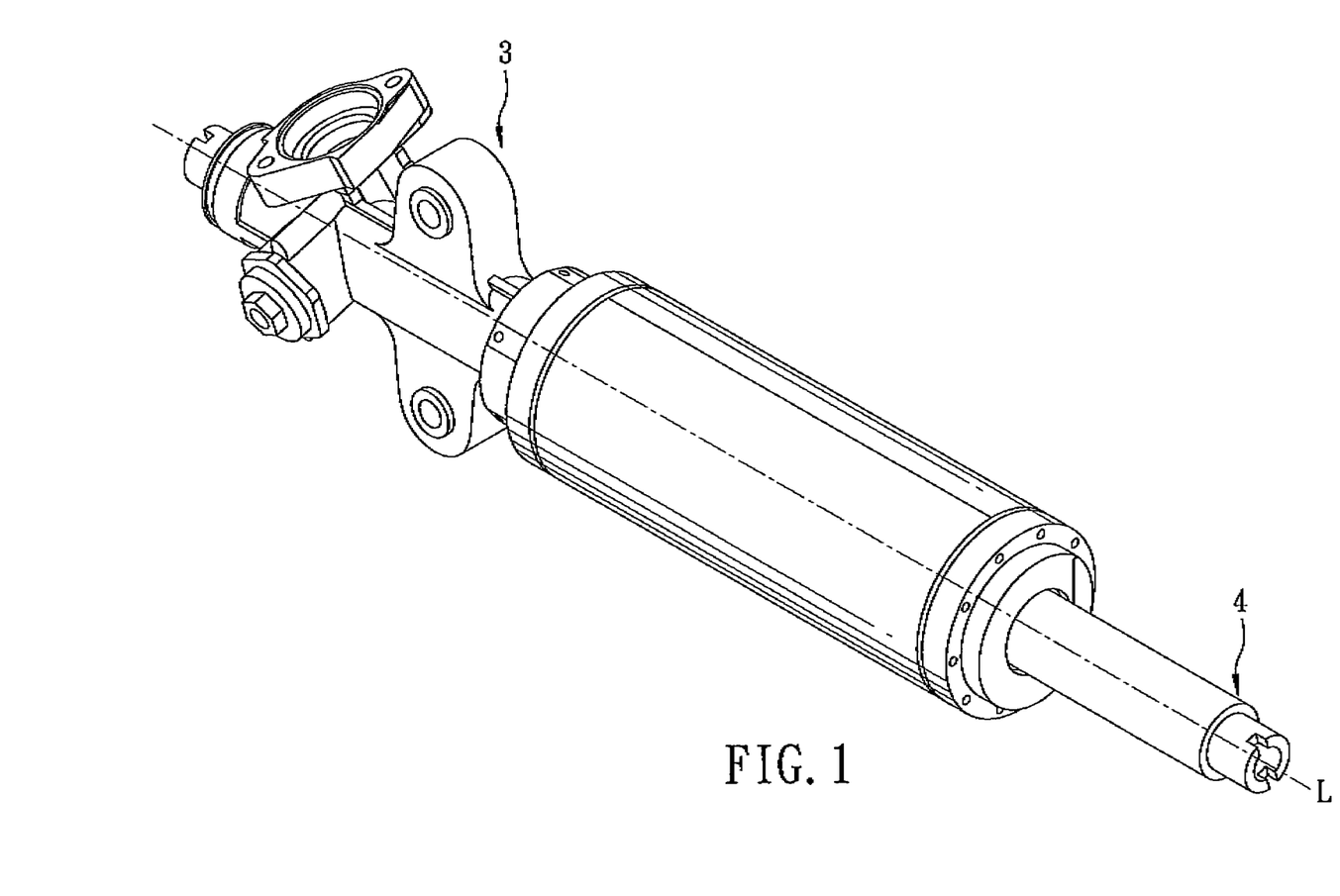
FIG. 1 is an assembled perspective view of the preferred embodiment of a linear actuating device for vehicle use according to the present invention.
Figure 2:
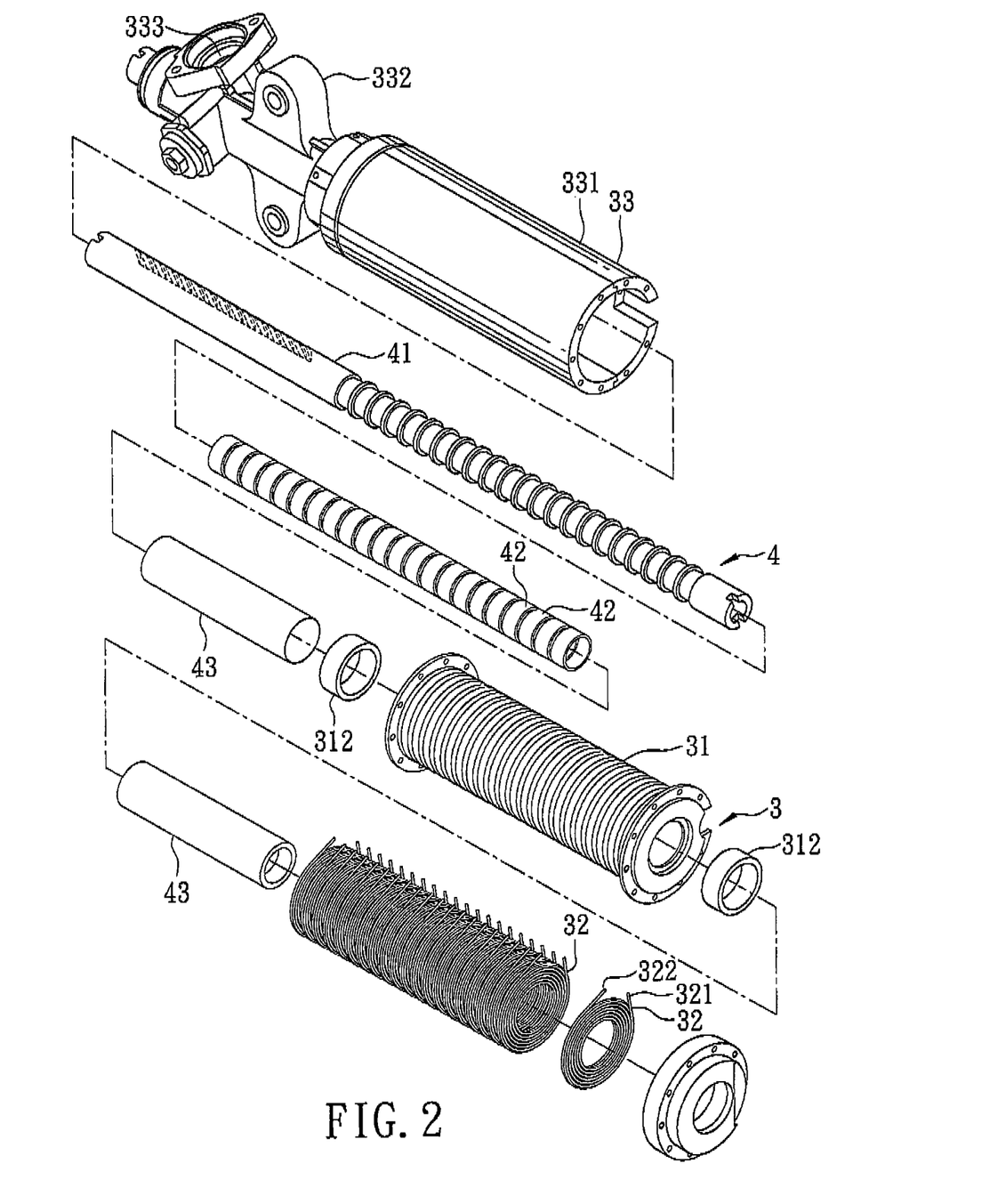
FIG. 2 is an exploded perspective view of the preferred embodiment.
Figure 6:
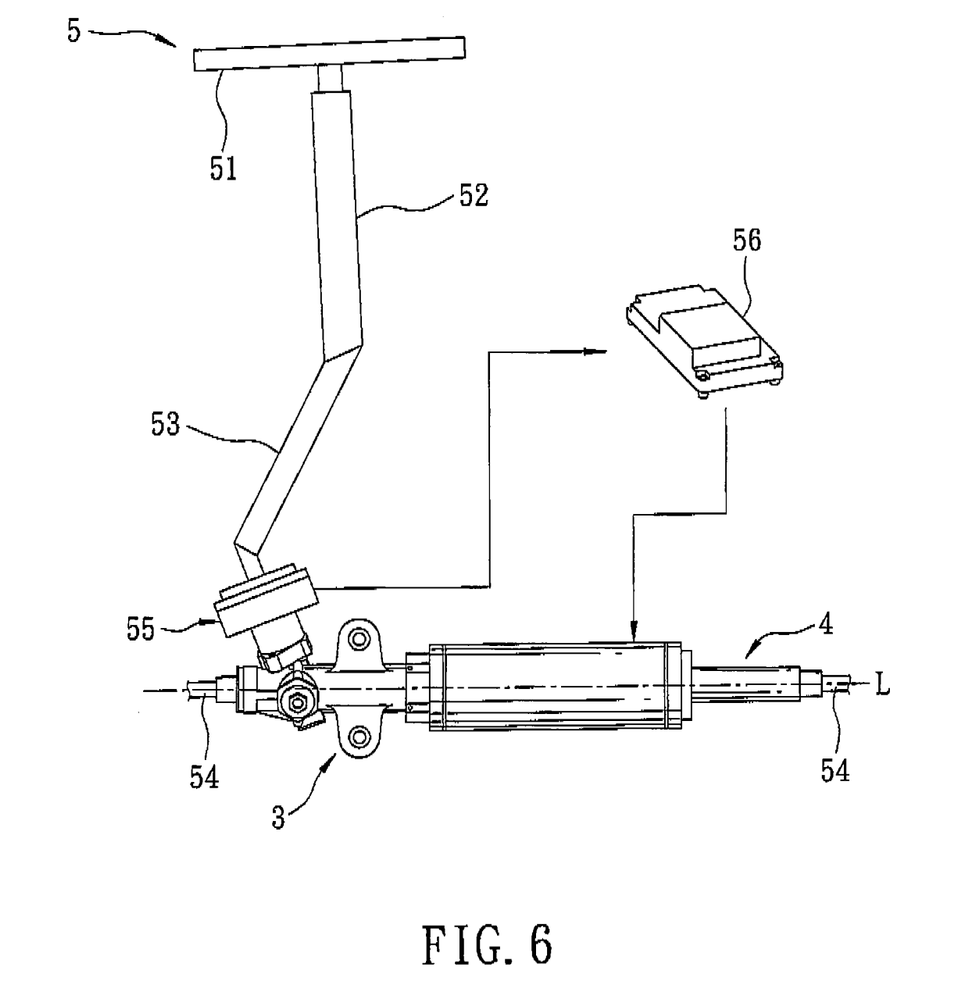
FIG. 6 illustrates the preferred embodiment applied in a steering system of a vehicle.

Referring to FIGS. 1, 2 and 6, the preferred embodiment of the linear actuating device for vehicle use according to the present invention is shown to be adapted for use in a vehicle steering system 5 that includes a steering wheel 51, a steering column 52 connected to the steering wheel 51, an intermediate linking rod 53 connected to the steering column 52 for linked rotation, and a pinion (not shown in the Figure) mounted to the intermediate linking rod 53. The vehicle steering system 5 further includes a pair of axle members 54 (for example, tie rods) movable along an axis (L) by rotation of the pinion, a torque sensor 55 connected to the intermediate linking rod 53, and an electronic control unit (ECU) 56 connected electrically to the torque sensor 55 and the linear actuating device. The linear actuating device includes a track unit 3 and a forcer unit 4. The track unit 3 may be a stator.

Figure 3:
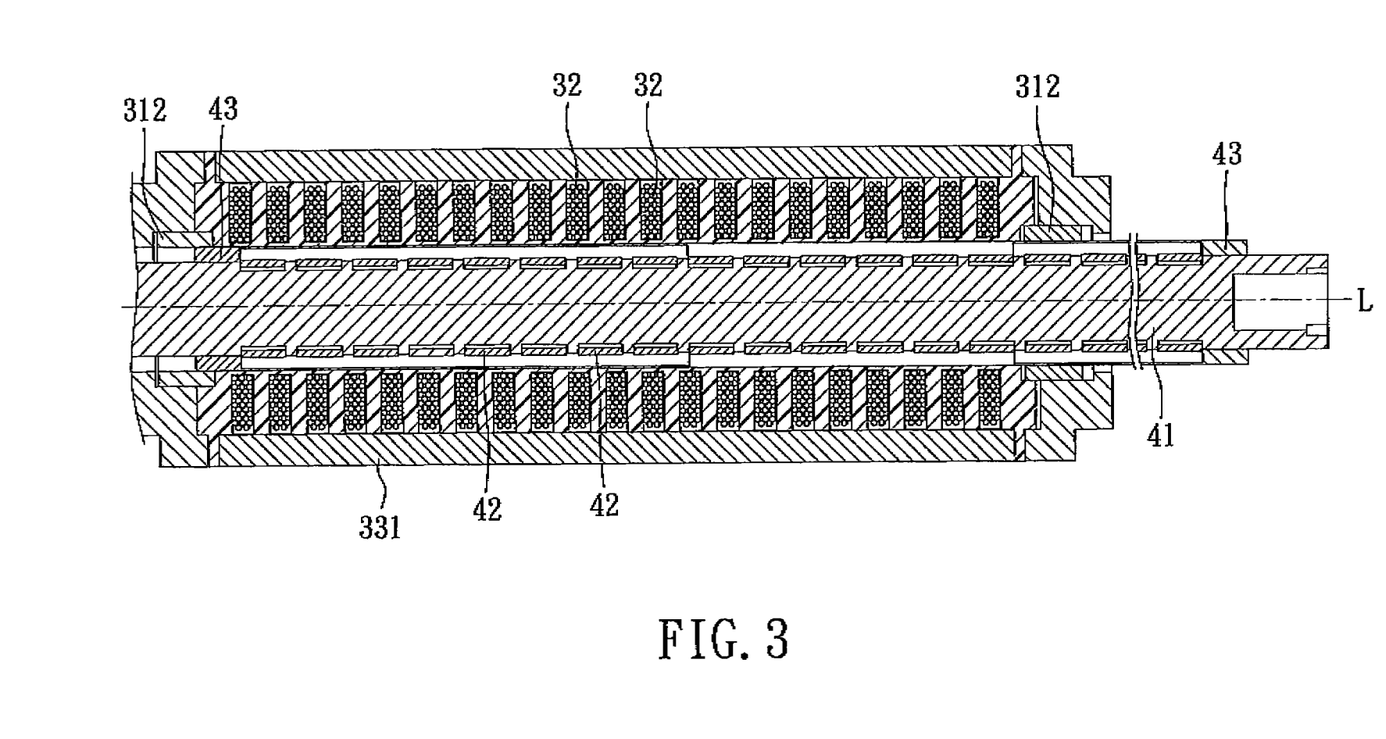
FIG. 3 is a sectional view of the preferred embodiment.

Referring to FIGS. 2, 3 and 6, the track unit 3 includes an insulating sleeve 31 made of non-metallic material and surrounding an axis (L), a plurality of coils 32 mounted spacedly and sleevingly on the insulating sleeve 31 along the axis (L), and a shell 33. The shell 33 includes a cover 331 containing the insulating sleeve 31 and the coils 32, and a fixation part 332 connected to the cover 331 for mounting of the vehicle steering system 5. The fixation part 332 is formed with a cavity 333 that the pinion may be mounted in. In this embodiment, the insulating sleeve 31 is made of Nylon.

Figure 4:
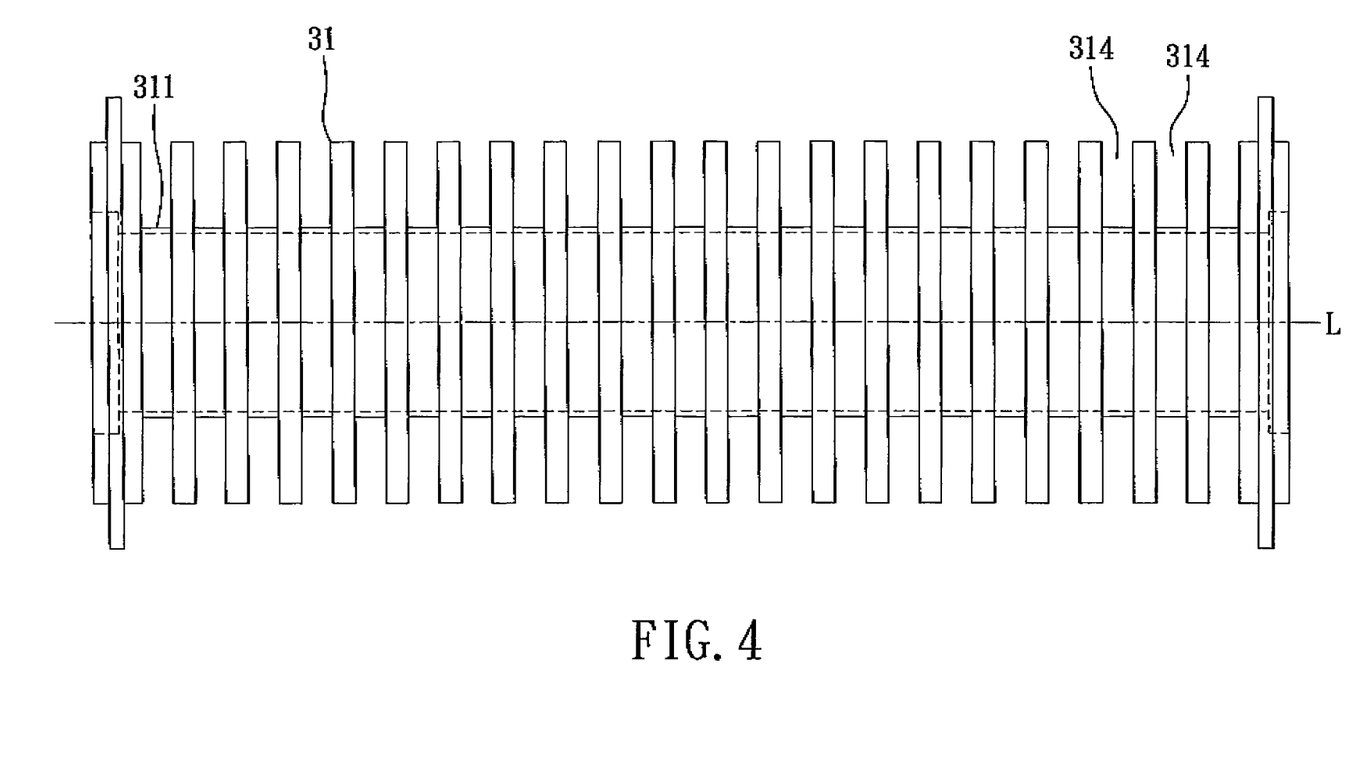
FIG. 4 is a side view of an insulating sleeve of the preferred embodiment.

Referring to FIGS. 2, 3 and 4, the insulating sleeve 31 includes an outer wall 311 surrounding the axis (L), a pair of outer bushings 312 mounted on respective opposite ends of the insulating sleeve 31, and a plurality of accommodating grooves 314 spacedly formed on an outer surface of the outer wall 311 along the axis (L) and configured for accommodating the coils 32. The distance between each adjacent pair of the accommodating grooves 314 determines the variation of the corresponding magnetic fields of the coils 32, and the spacing can therefore be adjusted as needed.

Each of the coils 32 has a first end 321 and a second end 322 for electric input. In this embodiment, the electronic control unit 56 drives how electricity is input to the coils 32.

Figure 5:
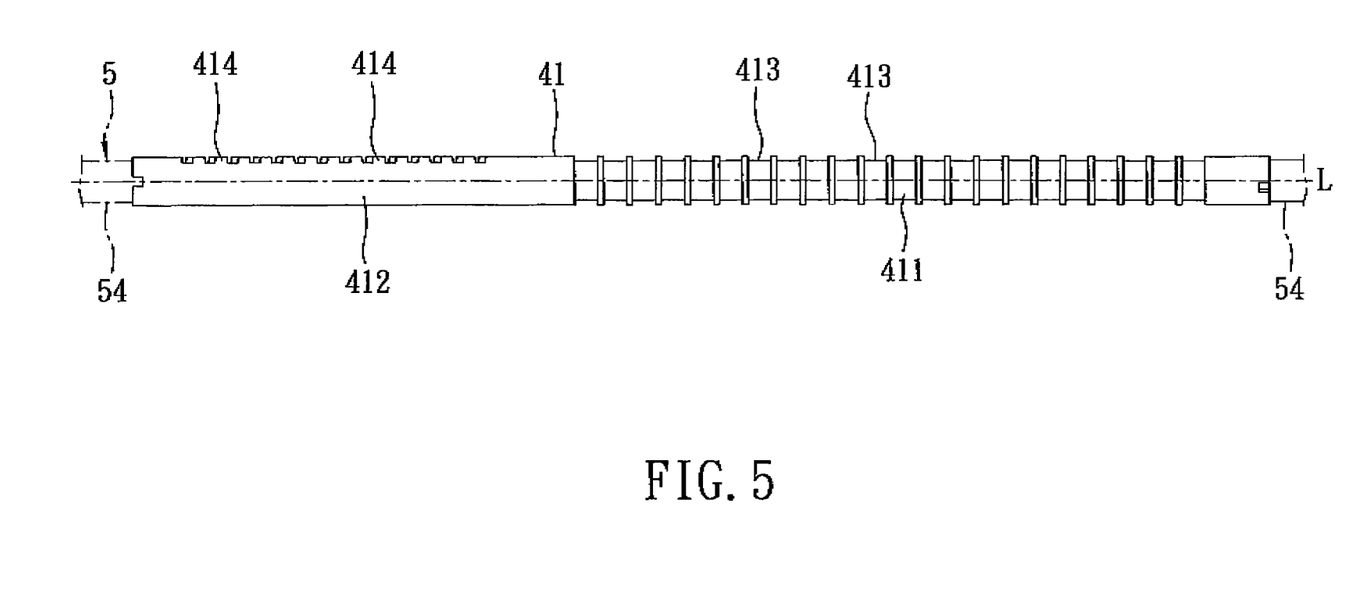
FIG. 5 is a side view of an elongate member of the preferred embodiment.

Referring to FIGS. 2, 3 and 5, the forcer unit 4 includes an elongate member 41 that extends through the insulating sleeve 31, and that has a segment configured for connecting to a vehicle shaft, e.g., the axle members 54 of the vehicle steering system 5. The elongate member 41 may be a movable shaft or bar. The elongate member 41 is movable along the axis (L) relative to the insulating sleeve 31. A plurality of magnets 42 are mounted spacedly and sleevingly on the elongate member 41 along the axis (L). Each of a pair of inner axial cylinders 43 is disposed between the elongate member 41 and an inner side of a corresponding one of the outer bushings 312. In this embodiment, some of the magnets 42 are covered by the inner axial cylinders 43, and are positioned by the inner axial cylinders 43 such that an air gap is maintained between the magnets 42 and the coils 32. The magnetic poles of the magnets 42 disposed proximate to the insulating sleeve 31 can be arranged to have a repeating sequence of north poles ends of the plurality of magnets 42 each being disposed adjacent to a corresponding south pole end of corresponding adjacent ones of the plurality of magnets 42. Each magnet 42 can be a solid ring or a ring composed of a plurality of small magnetic pieces. Each magnet 42 can therefore be mounted sleevingly on the elongate member 41.

Referring to FIGS. 3, 5 and 6, the elongate member 41 includes a mounting part 411 for mounting sleevingly the magnets 42, a securing part 412 disposed opposite to the mounting part 411 and adapted to be connected to the pinion of the vehicle steering system 5, a plurality of magnet mounting grooves 413 spacedly formed on an outer surface of the mounting part 411 along the axis (L) for accommodating the magnets 42, and a plurality of teeth 414 disposed on the securing part 412 for meshing with the pinion of the vehicle steering system 5. The plurality of teeth 414 may be helical. In this embodiment, the elongate member 41 and the axle members 54 are integrally connected, but they may also be manufactured separately and assembled at a later time and place.

Referring to FIGS. 2, 3 and 6, when the steering wheel 51 is rotated, the torque sensor 55 detects the twist of torsion bar and obtains the torque value exerted on the shaft. Based on the detected torque value, the electronic control unit 56 causes a positive or negative voltage to be applied to the first end 321 of each of the coils 32 and an inverse negative or positive voltage to be applied to the second end 322 such that a magnetic field is generated for each of the coils 32. The magnetic fields of the coils 32 and the magnets 42 may result in repulsing or attracting forces that drive movement of the elongate member 41. The layout of the magnetic poles of the magnets 42 and the corresponding coils 32 may be designed to generate a linear force that controls the movement and position of the elongate member 41, which in turn controls the output of the steering system 5 to steer a vehicle.

Figure 7:
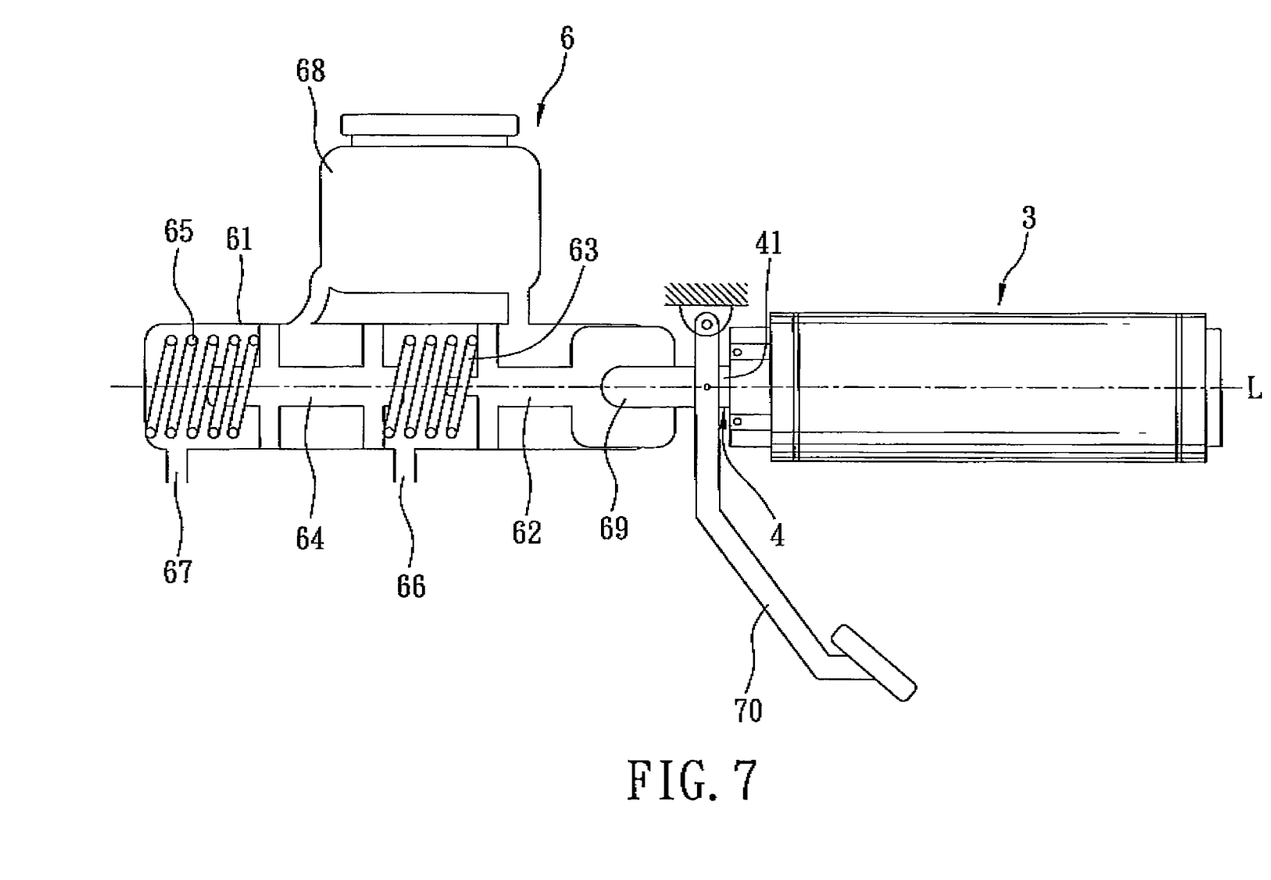
FIG. 7 illustrates the preferred embodiment applied in a vehicle braking system.

FIG. 7 illustrates the preferred embodiment applied in a vehicle braking system 6 that includes a piston shell 61, and a first piston 62, a first spring 63, a second piston 64, and a second spring 65 disposed in sequence along the axis (L) in the piston shell 61. The vehicle braking system 6 further includes a first oil outlet 66 and a second oil outlet 67 formed in the piston shell 61. The first oil outlet 66 and the second oil outlet 67 correspond to the first piston 62 and the second piston 64, respectively. The vehicle braking system 6 further includes a brake oil container 68 connected to the piston shell 61, a shaft 69 connected to the first piston 62 and the elongate member 41 of the forcer unit 4, and a brake pedal 70 connected to the shaft 69. In this embodiment, the elongate member 41 and the shaft 69 are integrally formed. However, in other embodiments, the elongate member 41 and the shaft 69 may be separate components that are individually manufactured and later assembled together.

When the brake pedal 70 is pressed, a control module (not shown) drives movement of the elongate member 41 along the axis (L), causing a linked movement of the shaft 69 and the first piston 62. As a result, the first spring 63 is compressed against the second piston 64, which causes the second piston 64 to move and compress the second spring 65. Relative movement between the first piston 62 and the second piston 64 drives a first oil volume through the first oil outlet 66 between the piston shell 61 and a brake mechanism (not shown) of the vehicle braking system 6. Movement of the second piston 64 relative to a corresponding end of the piston shell 61 drives a second volume of oil through the second oil outlet 67 between the piston shell 61 and the brake mechanism (not shown) of the vehicle shaft.

In other embodiments, this invention may also be applied to a vehicle suspension or other vehicle mechanisms by connecting the elongate member 41 to a suitable axle member 54.

In summary, the coils 32 and the insulating sleeve 31 of the linear actuating device for vehicle use of the present invention permit smooth movement of the elongate member 41 and a correspondingly smooth linked movement of the vehicle shaft coupled thereto. In comparison with the conventional linear actuating device, the present invention has fewer moving parts and may reduce a likelihood of part failure.

While the present invention has been described in connection with what is considered the most practical and preferred embodiment, it is understood that this invention is not limited to the disclosed embodiment but is intended to cover various arrangements included within the spirit and scope of the broadest interpretation to encompass all such modifications and equivalent arrangements.

What is claimed is:

1. A linear actuating device for use in a steering system of a vehicle, the steering system including a steering wheel, a pinion connection co-rotably to the steering wheel, a tie rod connected to said linear actuating device, and extending and movable along an axis for steering a wheel of the vehicle, a torque sensor for detecting rotation of the steering when and the pinion, and an electronic control unit connected electrically to the torque sensor and said linear actuating device, said linear actuating device comprising:

a track unit including
an insulating sleeve made of non-metallic material and surrounding the axis,
a plurality of coils mounted spacedly and sleevingly on said insulating sleeve along the axis, and adapted to be connected electrically to the electronic control unit, and
a shell containing said insulating sleeve and said coils; and a forcer unit including
an elongate member extending through said insulating sleeve, having a segment configured for connecting to the tie rod, and being moveable along the axis relative to said insulating sleeve for driving axial movement of the tie rod, and
a plurality of magnets mounted spacedly relative to the axis and sleevingly on said elongate member;

wherein said elongate member includes a mounting part having an outer surface formed with a plurality of magnet mounting grooves spaced apart relative to the axis, each of said magnets being sleeved over said elongate member and mounted in a corresponding one of said magnet mounting grooves; and wherein said elongate member further includes a securing part disposed opposite to said mounting part, and a plurality of gear teeth disposed on said securing part for meshing with the pinion, the electronic control unit applying positive or negative voltage to the coils based on the rotation of the pinion detected by the torque sensor to drive axial movement of the elongate member and the tie rod to thereby aid steering the wheel of the vehicle.

2. The linear actuating device as claim in claim 1, wherein said insulating sleeve has an outer wall that defines a plurality of accommodating grooves spaced apart relative to said axis and configured for accomodating said coils.

3. The linear actuating device as claim in claim 2, wherein said insulating sleeve further includes a pair of outer bushings mounted on respective opposite ends of said insulating sleeve, said forcer unit further including at least one inner axial cylinder extending into a corresponding on eof said outer bushings for positioning said forcer unit relative to said track unit.

4. A linear actuating device for use in a braking system of a vehicle, the braking system including a brake pedal connected to said linear actuating device, and a control module for driving said linear actuating device, said linear actuating device comprising:

a track unit including
- an insulating sleeve made of non-metallic material and surrounding an axis,
- a plurality of coils mounted spacedly and sleevingly on said insulating sleeve along the axis, and
- a shell containing said insulating sleeve and said coils; and a forcer unit including
- an elongate member extending through said insulating sleeve, having a segment configured for connecting to the brake pedal, and being movable along the axis relative to said insulating sleeve for driving movement of the brake pedal, and
- a plurality of magnets mounted spacedly relative to the axis and sleevingly on said elongate member;

wherein said elongate member includes a mounting part having an outer surface formed with a plurality of magnet mounting grooves spaced apart relative to the axis, each of said magents being sleeved over said elongate member and mounted in a corresponding one of said magnet mounting grooves, when the brake pedal is pressed, the control module driving axial movement of said elongate member to exert assistant force to the brake pedal.

5. The linear actuating device as claimed in claim 4, wherein said insulating sleeve has an outer wall that defines a plurality of accommodating grooves spaced apart relative to said axis and configured for accommodating said coils.

6. The linear actuating device as claimed in claim 5, wherein said insulating sleeve further includes a pair of outer bushings mounted on respective opposite ends of said insulating sleeve, said forcer unit further including at least one inner axial cylinder extending into a corresponding one of said outer bushings for positioning said forcer unit relative to said track unit.

\* \* \* \* \*